United States Patent [19]

Somal

[11] Patent Number: 4,467,661
[45] Date of Patent: Aug. 28, 1984

[54] LOAD CELL WITH OVERLOAD PROTECTION SYSTEM

[75] Inventor: Hardev S. Somal, LaPorte, Ind.

[73] Assignee: Maatschappij van Berkel's Patent N.V., Leidschendam, Netherlands

[21] Appl. No.: 548,039

[22] Filed: Nov. 3, 1983

Related U.S. Application Data

[63] Continuation of Ser. No. 308,112, Oct. 2, 1981, abandoned.

[51] Int. Cl.³ .............................................. G01L 1/26
[52] U.S. Cl. ........................... 73/862.62; 73/862.65; 177/229
[58] Field of Search ........... 73/862.38, 862.62, 862.65, 73/862.66; 177/184, 229

[56] References Cited

U.S. PATENT DOCUMENTS

| 3,135,112 | 6/1964 | Farley | 73/862.62 |
| 3,304,773 | 2/1967 | Rogallo | 73/862.68 |
| 3,646,809 | 3/1972 | Pugnaire | 73/862.38 |
| 4,103,545 | 8/1978 | Rykwalder et al. | 73/862.62 |
| 4,196,784 | 4/1980 | Suzuki et al. | 73/862.65 X |
| 4,338,825 | 7/1982 | Amlani et al. | 73/862.65 |

FOREIGN PATENT DOCUMENTS 2753549 5/1979 Fed. Rep. of Germany ... 73/862.65

Primary Examiner—Charles A. Ruehl
Attorney, Agent, or Firm—Lloyd L. Zickert

[57] ABSTRACT

A load cell having a self-contained overload protection system for preventing the load cell from being loaded beyond its rated capacity, wherein the load cell includes fixed and movable end constraints in spaced relation, upper and lower flexures between the constraints, a sensing beam coacting with the constraints and flexures and having means for sensing stresses, a cantilever beam extending from one of the end constraints coacting with the cantilever beam to prevent the load cell from exceeding its safe overload range.

4 Claims, 10 Drawing Figures

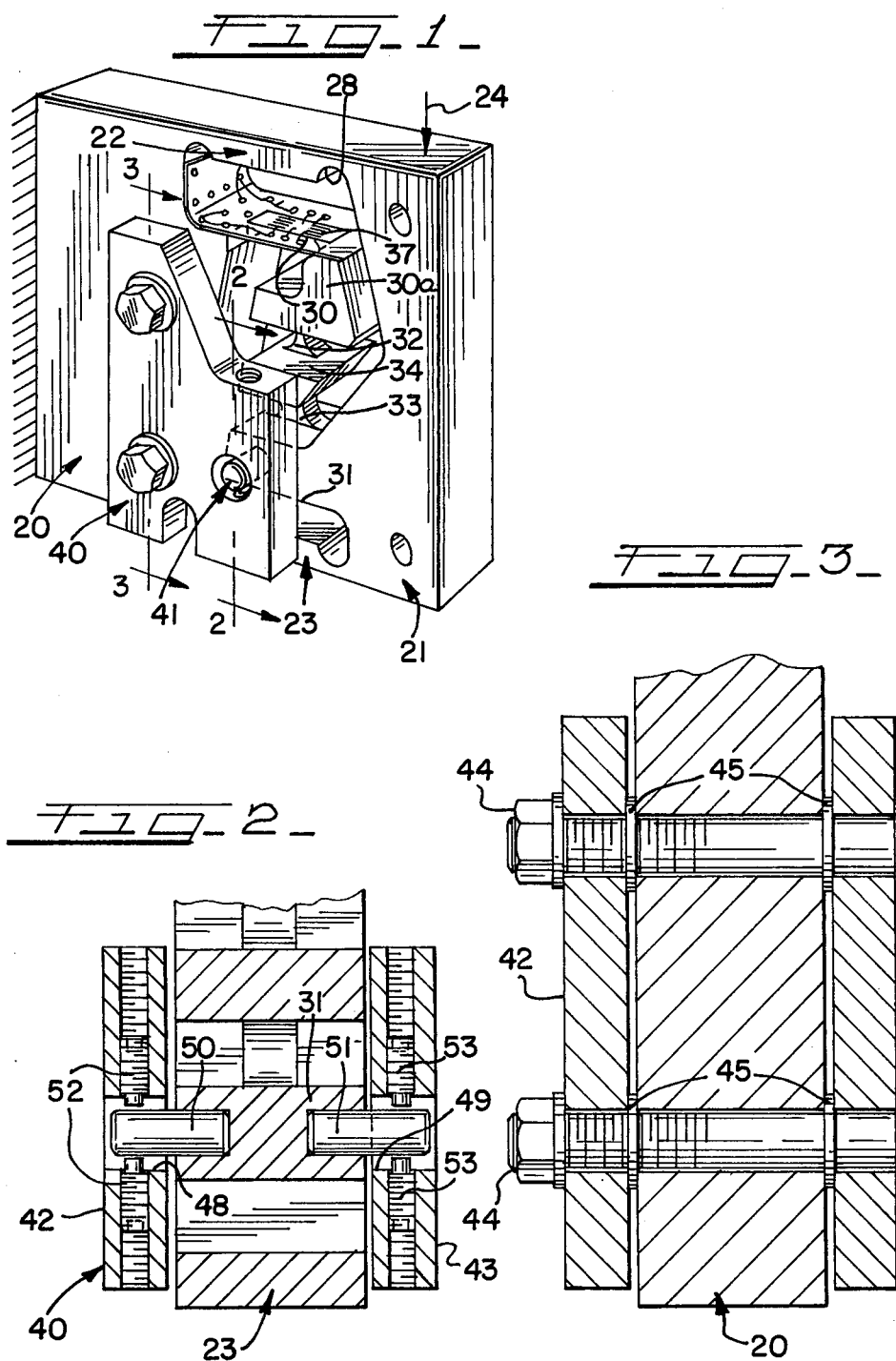

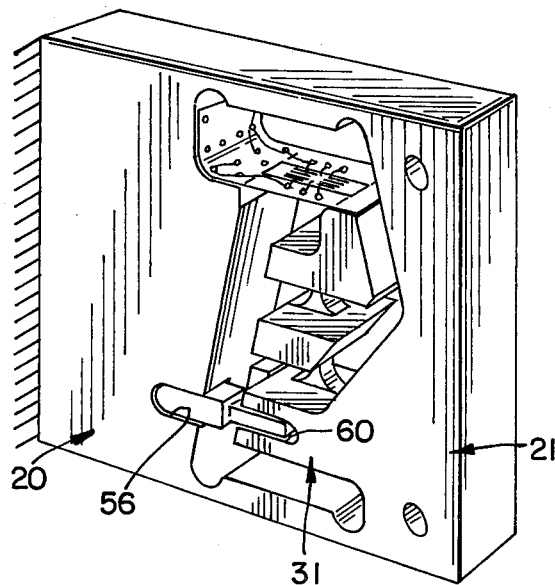
FIG_4_
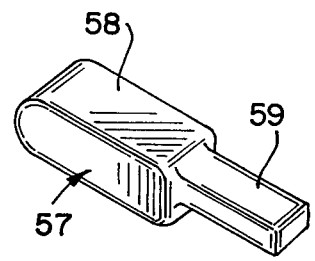
FIG_6_
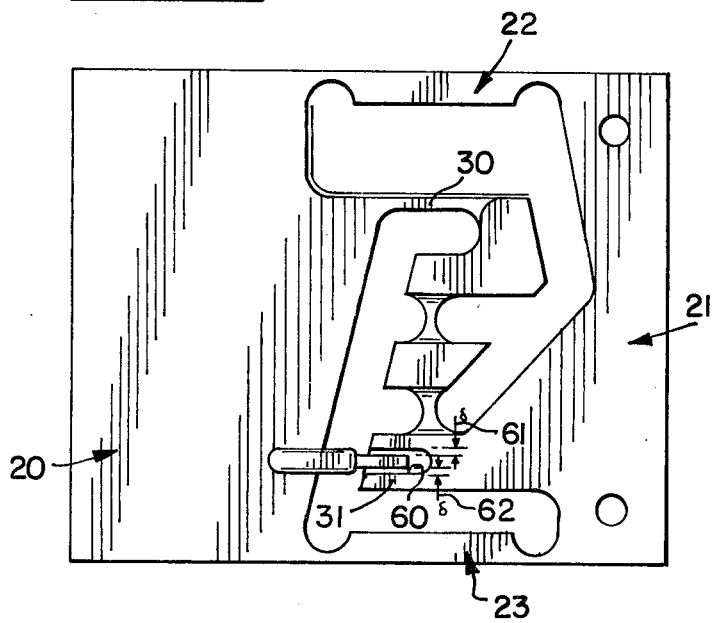
FIG_5_

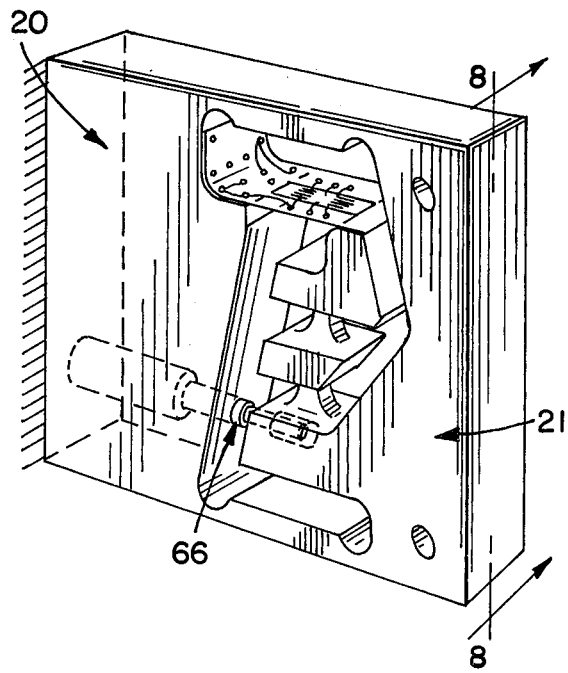
FIG-7-
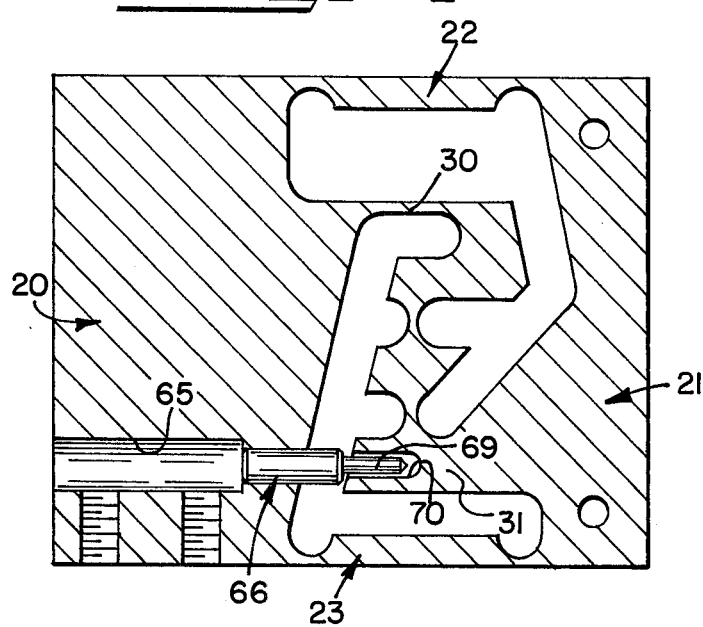
FIG-8-

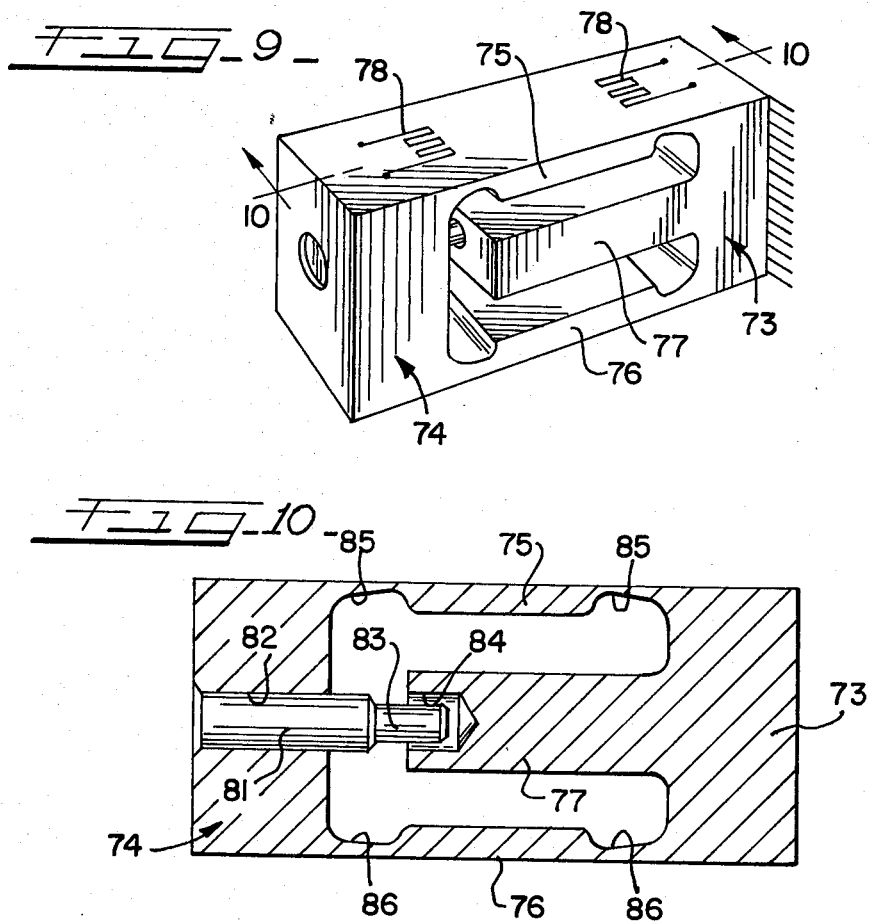

LOAD CELL WITH OVERLOAD PROTECTION SYSTEM

This is a continuation of application Ser. No. 308,112, filed Oct. 2, 1981, now abandoned.

This invention relates in general to a load cell, and more particularly to a load cell having an overload protection system that protects the load cell from overloads irrespective of the rate of loading, and still more particularly to an overload protection system that is self-contained within the load cell and which functions only when the load cell is loaded beyond its rated capacity.

The load cell of the present invention is particularly useful in protecting load cells of the type shown in U.S. Pat. No. 4,181,011, which includes spaced-apart fixed and movable end constraints interconnected by upper and lower flexures and a sensing beam coacting with the end constraints and flexures. It has been known to provide an overload protection device for this type of load cell, as shown in U.S. Pat. No. 4,254,841, which makes use of helical springs and sliding cam members. Because of the high response time of these elements, the effectiveness of the system is unsatisfactory when the load cell is subjected to accidental loading or shock loading which may be experienced during shipping or normal service. It has been found that damage to load cells caused by such shock loading has been extensive. Further, the overload device disclosed in U.S. Pat. No. 4,254,841 depends upon the weighing scale structure for operation so that it will not have the protection desired in all applications.

The load cell with the overload protection system according to the invention overcomes the difficulties of heretofore known load cells having such a system in that it protects against shock loading as well as gradually applied loads. Moreover, the system of the present invention is self-contained within the load cell, and therefore it protects the load cell wherever it is used or subjected to any overload. The load cell of the present invention includes a cantilever beam extending from one of the end constraints and coacting with a stop member extending from the other of the end constraints to limit the relative movement between the end constraints. The system may be of the adjustable or fixed type.

It is therefore an object of the present invention to provide a new and improved overload protection system for a load cell that is self-contained within the load cell and capable of protecting the load against both shock loading and gradually applied loads.

Another object of this invention is in the provision of a load cell having a built-in overload protection system that does not interfere with normal operation of the load cell and which effectively protects the load cell from overloads irrespective of the rate of loading.

A further object of this invention is in the provision of a load cell having an overload protection system that does not interfere with the normal operation of the load cell and only becomes operative at a certain predetermined load in the safe overload range of the load cell, thereby protecting the sensing beam of the load cell from permanent plastic deformations.

Other objects, features and advantages of the invention will be apparent from the following detailed disclosure, taken in conjunction with the accompanying sheets of drawings, wherein like reference numerals refer to like parts, in which:

FIG. 1 is a perspective view of a load cell having an overload protection system according to the invention;

FIG. 2 is a greatly enlarged vertical sectional view taken substantially along line 2—2 of FIG. 1;

FIG. 3 is a greatly enlarged vertical sectional view taken substantially along line 3—3 of FIG. 1;

FIG. 4 is a perspective view of a load cell of the type shown in FIG. 1 and having a modified overload protection system;

FIG. 5 is a side elevational view of the load cell of FIG. 4;

FIG. 6 is a perspective view of the key member used in the embodiment of FIGS. 4 and 5;

FIG. 7 is a perspective view of a load cell of the type shown in FIG. 1 with a still further modified overload protection system according to the invention;

FIG. 8 is a side longitudinal sectional view taken substantially along line 8—8 of FIG. 7;

FIG. 9 is a perspective view of another type of load cell having the overload protection system of the present invention of the type illustrated in the embodiment of FIGS. 7 and 8; and FIG. 10 is a longitudinal sectional view taken substantially along line 10—10 of FIG. 9.

Referring now to the drawings, and particularly to the embodiment shown in FIGS. 1 to 3, the overload protection system of the present invention is illustrated as being applied to a load cell of the type illustrated in U.S. Pat. No. 4,181,011. This load cell generally includes a fixed end constraint 20, a movable end constraint 21, an upper stabilizer flexure 22 connected between the end constraints and a lower stabilizer flexure 23 connected between the end constraints such that application of a force on the movable constraint at a point indicated by the arrow 24 will cause deflection of the movable end constraint, and since the constraints and flexures define a parallelogram structure, that deflection will essentially be vertically downward. Each of the stabilizer flexures is provided with semi-circular fillets 28 to more accurately define the flexing of the flexures.

A sensing beam 30 extends from the fixed end constraint and is connected to an enlarged beam end constraint 30a which is in turn connected to a beam or projection 31 that extends from the movable end constraint 21 through necked down sections 32 and 33 and an enlarged center section 34. Strain gauges 37 are mounted on the upper surface of the sensing beam 30 for measuring the stresses induced in the sensing beam representative of a force applied to the movable end constraint. More detailed operation of the load cell is set forth in the above identified patent.

The load cell is made from a block of suitable material such as an aluminum alloy by machining operations. Such a material has an elastic limit which if exceeded will overload and damage the material. Preventing overload and damage of a load cell assures long life and accurate weight measurements.

The overload protection system of the present invention does not interfere with the normal operation of the load cell and is directly mounted on the load cell to provide coaction between the fixed and movable end constraints in order to prevent a damaging overload to be induced into the sensing beam. The system includes a cantilever beam 40 mounted on the fixed end constraint 20 and a stop 41 coacting with the beam and carried by the movable end constraint 21. The cantilever beam 40, as seen particularly in FIGS. 2 and 3, includes opposed tapered beam sections 42, 43 which are of the same shape and are securely fastened to the fixed end constraint by nut and bolt assemblies 44. Spacer washers 45 are provided on the nut and bolt assemblies in order to slightly space the beam sections from the fixed end constraint so that the portions overlapping the lower flexure 23 and the movable end constraint will not interfere with their movement. Through holes 48 and 49 are provided in the beam sections 42 and 43. The stop 41 includes stop pins 50 and 51 that project into holes 48 and 49 and are press-fit into openings formed in the movable end constraint beam 31. The diameter of the stop pins is substantially less than the diameter of the holes 48, 49 so that relative movement of the pins in the holes can be accomplished.

In order to adjustably limit the movement of the pins in the blind holes, set screws 52 are provided in the beam section 42 and set screws 53 are provided in the beam section 43 which are received in threaded holes that are formed along a vertical axis in line with the center axis of the pins. With respect to a gradual or shock load applied in a downward direction on the movable end constraint, the lower set screws can be set to limit movement of the movable end constraint relative to the fixed end constraint, while the upper set screws limit the upward movement of the pins whereby the bounce-back of the movable end constraint relative the fixed end constraint is controlled. While the holes 48 and 49 and the pins 50 and 51 could be precisely sized to define the gaps between the holes and pins and thereby a fixed range of movement allowable by the movable end constraint, the set screws enable the range of movement to be adjustable and eliminate the need to precisely machine the holes and pins.

It will be appreciated that by controlling the range of movement of the movable end constraint, the bending or deformation of the sensing beam will likewise be controlled in the same amount. Should the pins engage the set screws as a result of an excessive load, that excessive load would be transferred directly to the cantilever beam 40 and the fixed end constraint 20. Accordingly, the top and bottom set screws can be adjusted to the desired gap between the pins and the set screws to avoid overloading of the sensor beam, although the set screws would be set so that they would not be engaged by the stop pins unless the load cell is loaded beyond its rated capacity. Following engagement between the pins and the set screws on the cantilever beam, the cantilever beam acts in parallel with the sensor beam, and the deflection of the sensor beam and the cantilever beam is the same. It can now be appreciated that the overload protection system will protect against shock loading and gradually applied load and also against "bounce-back" caused by the spring action of the load cell under impact load. It should be recognized that the cantilever beam could be mounted on the movable end constraint to provide the overload protection system.

An alternative form of the overload protection system of the invention is illustrated in FIGS. 4, 5 and 6 wherein cavities 56 (only one shown) are milled into the opposite faces of the fixed end constraint 20 to receive in press-fit relation keys 57 which function as the stop means. The keys 57 include an enlarged head 58 that is sized to be press-fit into the milled slots or openings 56 and a reduced stop section 59 that is freely received in milled slots 60 formed in the movable end constraint beam 31. As seen particularly in FIG. 5, the width of the cavity or slot 60 is greater than the width of the key end section 59 to provide a gap 61 between the upper face of the end section and the slot and a gap 62 between the lower face of the end section and slot. This gap is not adjustable and therefore accurate machining and close tolerances must be followed. Moreover, the key is preferably made out of a stronger material than the load cell, such as steel. This embodiment is more compact than the embodiment of FIGS. 1 to 3 in that there is no need for using nut-and-bolt assemblies and the cantilever beam, thereby making it more reliable and economical. In effect, the head portion of the key 57 constitutes the cantilever beam in that it is essentially integral with the fixed end constraint 20.

A further embodiment of the overload protection system of the invention is illustrated in FIGS. 7 and 8 which differs slightly from the embodiment of FIGS. 4 and 5 in that a counterbored hole 65 is drilled in fixed end constraint 20 to receive in the smaller portion a pin or stop member 66 in press-fit relation. The pin 66 includes a stepped down portion 69 that is freely received in a blind hole 70 drilled in the movable end constraint beam 31. Thus, only a single pin 66 is needed in order to coact with the movable end constraint to define the overload protection system. The end section 69 of the pin 66 and the hole 70 must be machined with close tolerances to provide the necessary and desired working gap and allow the desired movement within the range of the load cell before stopping movement of the movable end constraint relative the fixed end constraint.

The embodiment of FIGS. 9 and 10 illustrates another type of load cell for which the overload protection system of the present invention can be used. This load cell generally includes a fixed end constraint 73, a movable end constraint 74, upper and lower flexures 75 and 76, and an intermediate cantilever beam 77 extending from the fixed end constraint 73. The upper and lower flexures 75 and 76 double as a sensing beam and therefore have secured thereto strain gauges 78 at the flex areas for detecting the stresses which will be representative of the load applied to the movable end constraint. Details of this load cell are set forth in my copending application.

The overload protection system for this load cell is of the same general type that is disclosed in the embodiment of FIGS. 7 and 8 in that an overload protection stepped pin 81 on one of the constraints coacts with a hole formed in a beam extending from the other end constraint. The pin in this embodiment is mounted on the movable end constraint although it should be appreciated that the cell could be made whereby the beam would extend from the movable end constraint and the pin mounted in the fixed end constraint. The pin 81 is press fit into a hole 82 formed in the movable end constraint 74 and provided with a necked down end section 83 which is freely received within a blind hole 84 precisely formed in the end of the intermediate beam 77. The operation of the overload protection system in this embodiment will be essentially like that of the embodiment in FIGS. 7 and 8.

From the foregoing, it can be appreciated that the present invention provides a unique and economical overload protection system for load cells that will protect against both shock and gradual loading.

It will be understood that modifications and variations may be effected without departing from the scope of the novel concepts of the present invention, but it is understood that this application is to be limited only by the scope of the appended claims.

The invention is hereby claimed as follows:

1. In a load cell for measuring forces applied thereto having an overload protection system, wherein said load cell comprises a fixed end constraint, a movable end constraint horizontally spaced from said fixed end constraint, upper and lower flexures extending between said end constraints, a sensing beam coacting with said end constraints and flexures, and means for sensing stresses in said sensing beam resulting from a load applied to said movable end constraint, the improvement being in said overload protection system which includes a cantilever beam mounted on and extending from one of said end constraints, stop means mounted on the other of said end constraints coacting with the cantilever beam to limit movement of said movable end constraint and thereby protect the load cell against overload, said stop means including a pair of pins one extending from each side of the load cell, and said cantilever beam including a pair of beam sections one mounted on each side of said load cell and having holes freely receiving said pins, and means coacting with each said hole to adjustably limit movement of said pins including a pair of coaligned set screws mounted in said beam sections one on each side of a pin defining working gaps with the pins which limit movement of said movable end constraint.

2. The overload protection system defined in claim 1, wherein said cantilever beam is mounted on said fixed end constraint and said stop means is mounted on said movable end constraint.

3. In a load cell for measuring forces applied thereto having an overload protection system, wherein said load cell comprises a fixed end constraint, a movable end constraint horizontally spaced from said fixed end constraint, upper and lower flexures horizontally extending between said end constraints, and means coacting with said end constraints and flexures for sensing stresses resulting from a load applied to said movable end constraint, the improvement being in said overload protection system which includes a single, substantially rigid cantilever member disposed between said flexures and extending from one of said end constraints toward the other of said end constraints to reduce the spacing between said end constraints, said member being integrally formed with said one end constraint, a pin extending from and having one end press-fit into an opening formed in the cantilever member or the opposing end constraint and being axially aligned with said cantilever member, stop means on the other of said end constraints or the cantilever member including an opening formed therein receiving the free end of the pin and limiting movement of said movable end constraint to thereby protect the load cell against overload, the end of said pin and said opening within which it is received being sized to define working gaps for restricting movement of said movable end constraint within the rated capacity of the sensing means.

4. The improvement defined in claim 3, wherein said cantilever member extends from said fixed end constraint, and said stop means opening is formed in said movable end constraint.

* * * * *